No. 682,073. Patented Sept. 3, 1901.
H. HESTAND & A. R. MATTHEWS.
ROTARY ENGINE.
(Application filed Dec. 29, 1900.)

(No Model.) 3 Sheets—Sheet 1.

WITNESSES:

INVENTORS
Hardy Hestand.
Arthur R. Matthews.
BY
ATTORNEYS

No. 682,073. Patented Sept. 3, 1901.
H. HESTAND & A. R. MATTHEWS.
ROTARY ENGINE.
(Application filed Dec. 29, 1900.)
(No Model.) 3 Sheets—Sheet 2.
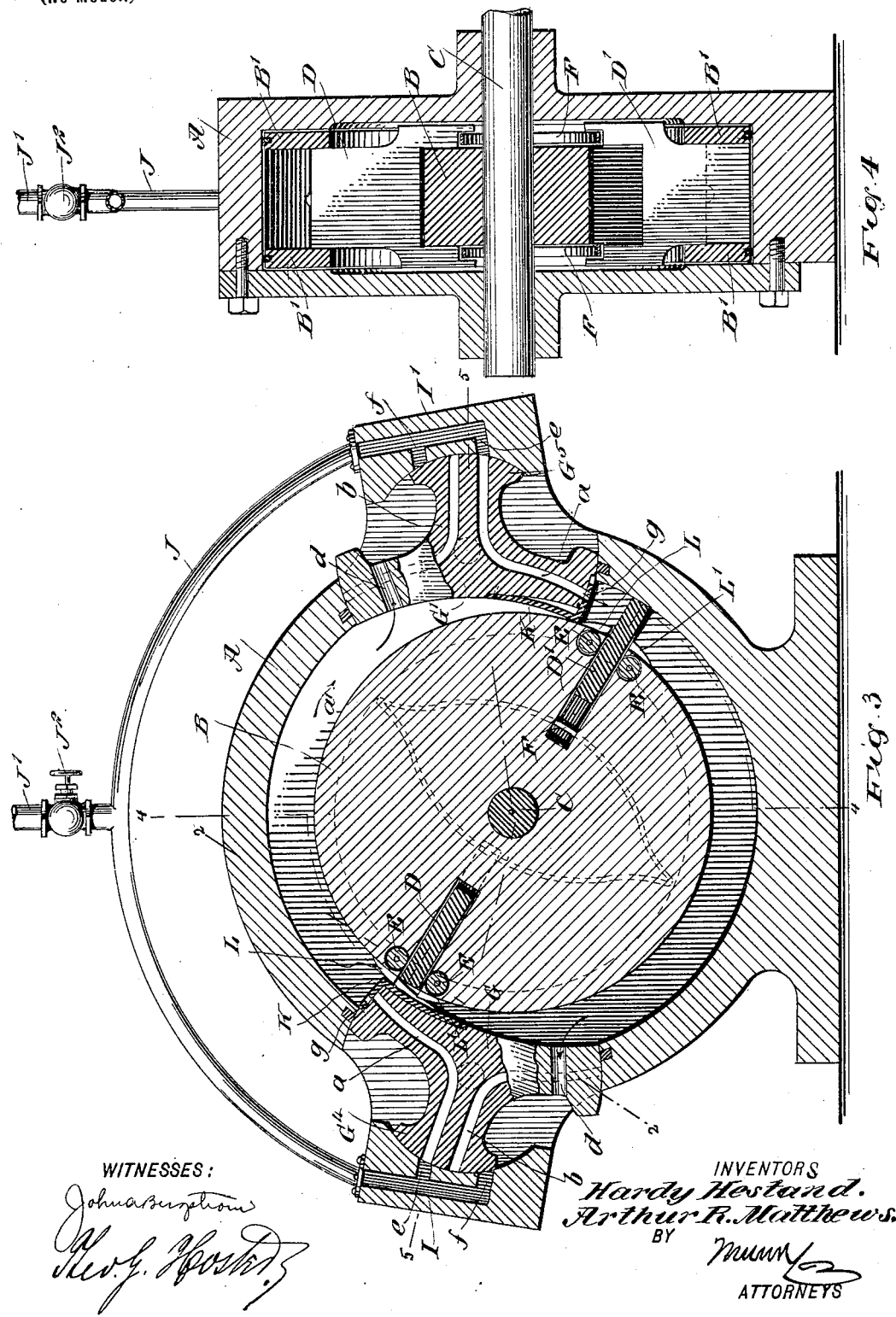
WITNESSES:
INVENTORS
Hardy Hestand.
Arthur R. Matthews.
BY
Munn
ATTORNEYS No. 682,073. Patented Sept. 3, 1901.
H. HESTAND & A. R. MATTHEWS.
ROTARY ENGINE.
(Application filed Dec. 29, 1900.)
(No Model.) 3 Sheets—Sheet 3.

WITNESSES:

INVENTORS
Hardy Hestand.
Arthur R. Matthews.
BY
ATTORNEYS

UNITED STATES PATENT OFFICE.

HARDY HESTAND AND ARTHUR R. MATTHEWS, OF DUNDEE, TEXAS.

ROTARY ENGINE.

SPECIFICATION forming part of Letters Patent No. 682,073, dated September 3, 1901.

Application filed December 29, 1900. Serial No. 41,452. (No model.)

*To all whom it may concern:*

Be it known that we, HARDY HESTAND and ARTHUR R. MATTHEWS, both citizens of the United States, and residents of Dundee, in the county of Archer and State of Texas, have invented a new and Improved Rotary Engine, of which the following is a full, clear, and exact description.

The object of the invention is to provide a new and improved rotary engine which is simple and durable in construction, very effective in operation, and arranged to utilize the motive agent to the fullest advantage, and to permit of convenient and quick reversing whenever desired.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
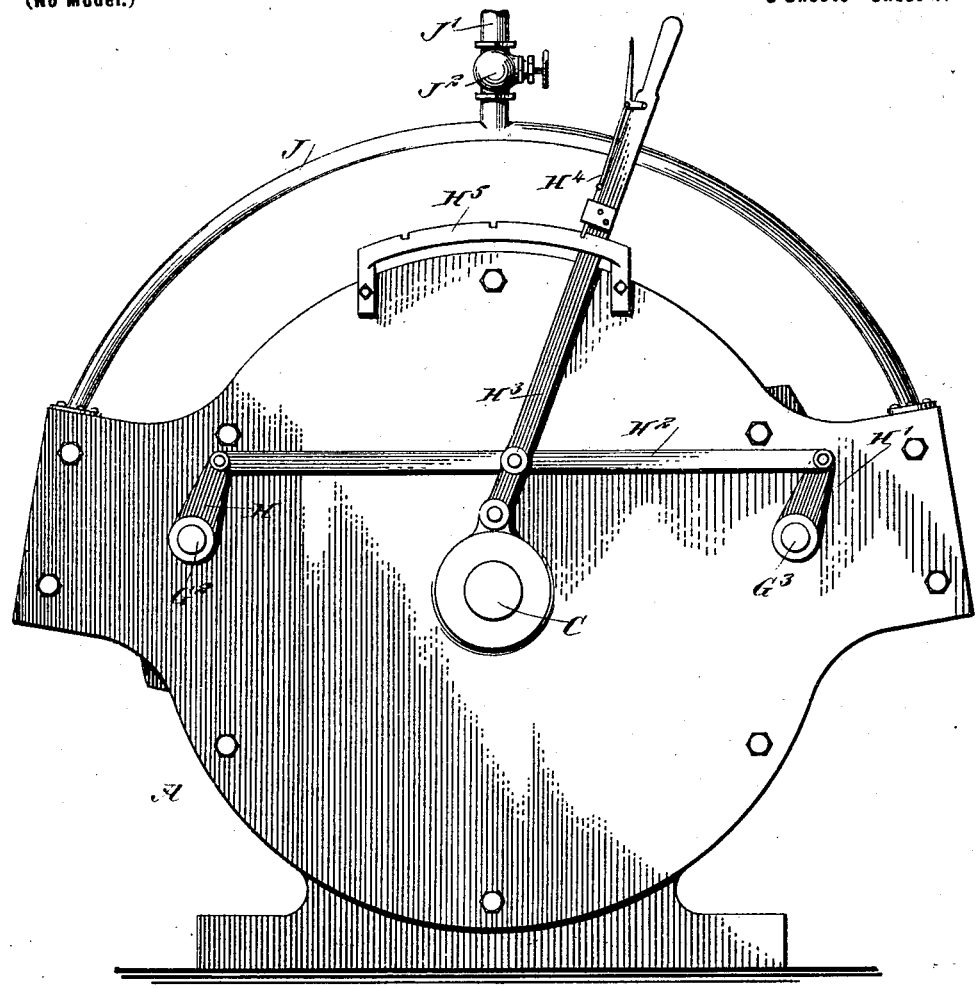
Figure 2:
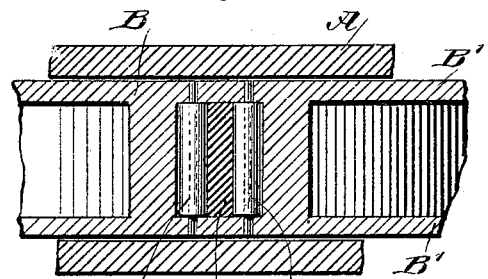
Figure 5:
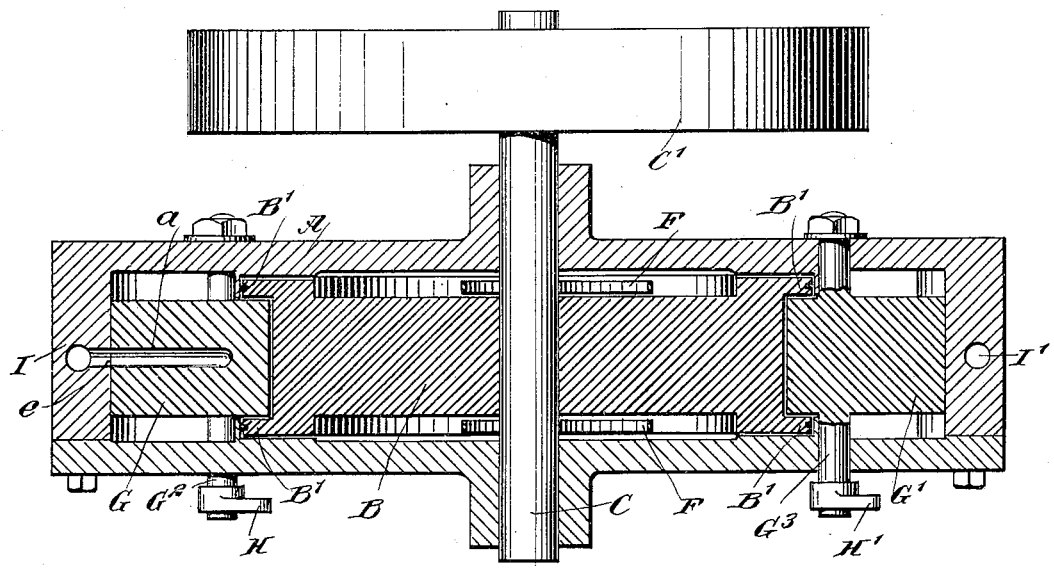
Figures 6, 7:
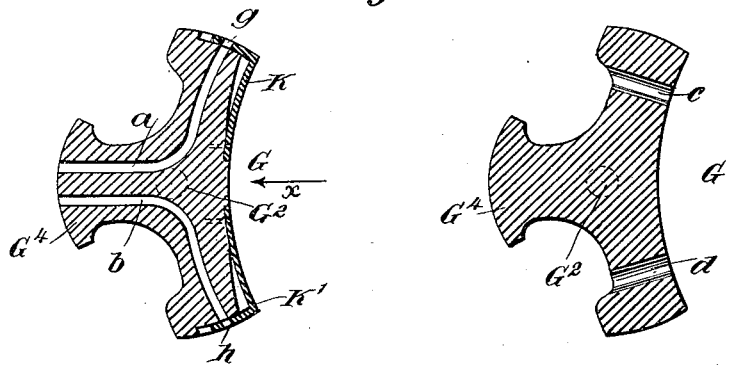
Figure 8:
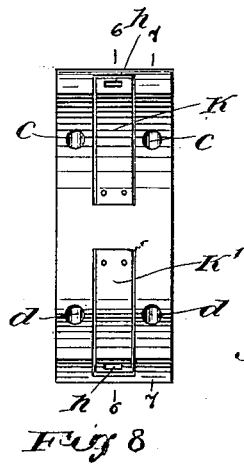

Figure 1 is an end elevation of the improvement. Fig. 2 is a sectional view of the same on the line 2 2 in Fig. 3. Fig. 3 is a sectional side view of the same. Fig. 4 is a transverse sectional elevation of the same on the line 4 4 in Fig. 3. Fig. 5 is a sectional plan view of the same on the line 5 5 in Fig. 3. Fig. 6 is a cross-section of one of the abutments, the section being on the line 6 6 in Fig. 8. Fig. 7 is a similar view of the same on the line 7 7 in Fig. 8; and Fig. 8 is a face view of the same, seen in the direction of the arrow $x$ in Fig. 6.

In the cylinder A of the engine is mounted to turn a concentric piston B, secured on a main shaft C, journaled in suitable bearings in the cylinder-heads and carrying at one outer end a pulley C′ for transmitting the rotary motion of the piston and the shaft to other machinery. In the piston B are arranged to slide radially the oppositely-disposed piston-heads D D′, engaged at opposite faces by friction-rollers E, journaled in the piston B to insure easy movement of the piston-heads as the latter slide inward and outward in the piston B. The inner ends of the piston-heads D D′ are engaged by springs F, preferably in the form of elliptical springs, and extending freely within the cylinder on opposite sides of the piston B, as is plainly indicated in the drawings, said springs serving to normally hold the piston-heads in an outermost position—that is, with the outer ends in engagement with the peripheral face of the cylinder A. The piston-heads D D′ are adapted to engage the inner cam-surfaces of the abutments G G′, extending in recesses formed in the cylinder A and located opposite each other, the abutments being provided with trunnions $G^2$ $G^3$, respectively journaled in suitable bearings in the cylinder-heads and provided at one outer end with arms H H′, connected with each other by a link $H^2$, pivotally connected with a hand-lever $H^3$ under the control of the operator and provided with the usual locking-pawl $H^4$, adapted to engage a segment $H^5$ to lock said hand-lever, and consequently the abutments, in the desired position to run the engine either forward or backward or to stop the same, as the case may be. The outer ends $G^4$ $G^5$ of the abutments G G′ form valves on the steam-chests I I′, secured to or integral with the cylinder A and connected with a motive-agent-supply pipe J, having a connection J′ with the boiler or with any other source of motive-agent supply. The connection J′ is provided with the usual valve $J^2$ for shutting off the motive agent whenever desired. Each of the abutments G G′ is formed with two inlet-ports $a\ b$, extending in opposite directions, and two exhaust-ports $c\ d$, located near the ends of the abutments, as is plainly indicated in Figs. 6, 7, and 8. The inlet-ports $a\ b$ extend through the valve end $G^4$ of the abutments and register with the ports $e$ and $f$, respectively, opening into the steam-chests I I′, so that the motive agent can pass from the steam-chests by way of the ports $e\ a$ into the cylinder at one end of the abutments, as indicated in Fig. 3, and when the position of the abutments is reversed then the motive agent passes by way of the ports $f\ b$ into the cylinder at the other end of the abutments, so that the motion of the piston B in the cylinder A is reversed. Each abutment is provided on its inner face with spring-valves K K′, extending over the ports $a\ b$ at the exit ends thereof, and said valves are provided with ports $g$ and $h$, normally in register with the ports *a* and *b*, but adapted to move out of register with said ports when the valves K or K' are moved inward by the action of the lugs L L' on the peripheral face of the piston B at opposite sides of the piston-heads D D', as is plainly indicated in Fig. 3. The piston B is preferably provided with annular flanges B', between which pass the piston-heads D D', said flanges fitting snugly on the inner faces of the cylinder-heads, as shown in Fig. 4, and between said flanges also extend the inner portions of the abutments G G'.

The operation is as follows: When the several parts are in the position illustrated in Fig. 3, then the abutments G G' connect by their ports *a* the steam-chests I I' with the interior of the cylinder, so that the motive agent passing into the cylinder acts on the piston-heads D D' and turns the piston in the direction of the arrow *a'*. It is understood that when the abutments are in this position the ports *e* and *a* are in register with each other, while the ports *b* and *f* are disconnected, so that the motive agent can only pass by way of the ports *e* and *a* to the interior of the cylinder during the time the valves K are in their normal position—that is, with their ports *g* in register with the ports *a*. When a piston-head D moves with its outer end in engagement with the inner or cam faces of the corresponding abutment, then this piston-head is pushed inward against the tension of the spring F in order that the piston-head may pass the abutment, and during the time the piston-head is passing over the last portion of the cam-surface the lugs L engage the spring-valve K and press the same outward, so that the ports *g* move out of register with the ports *a*, and consequently the motive agent is shut off from the interior of the cylinder for the time being, the exhaust taking place in the meantime through the exhaust-ports *d*, leading to the outer air. When it is desired to reverse the engine, the operator unlocks the pawl H⁴ and then swings the hand-lever H³ over into a reverse position to cause the abutments G G' to turn into opposite positions, so that the ports *b* become the inlet-ports for the motive agent, while the ports *c* become the exhaust-ports. It is understood that when this takes place the ports *b* register with the ports *f* and the inner ends of the ports *b* register with the ports *h* of the valves K', so that the motive agent can pass from the steam-chest to the interior of the cylinder except during the time that the valves K are actuated by the lugs L' to temporarily shut off the motive agent from the cylinder at the time the exhaust takes place by way of the exhaust-port *c*.

As shown in the drawings, two abutments and two piston-heads are employed; but it is evident that an engine may be constructed with a single abutment and a single piston-head or with a number of abutments and piston-heads.

Having thus fully described our invention, we claim as new and desire to secure by Letters Patent—

1. A rotary engine, comprising a cylinder, a piston mounted to turn therein, and provided with a movable piston-head, a steam-chest provided with inlet-ports, and an abutment mounted to rock and having an outer portion forming a valve on the steam-chest, the said abutment having sets of inlet and exhaust ports, and having an inner cam-surface for engagement by said piston-head, as set forth.

2. A rotary engine, comprising a cylinder, steam-chests on said cylinder and provided with inlet-ports, a piston mounted to turn in said cylinder and having spring-pressed piston-heads, and abutments mounted to be turned for reversing purposes and each having an outer portion forming a valve on the respective steam-chest, the said abutments each having sets of inlet and exhaust ports, of which the inlet-ports are adapted to connect with the inlet-ports of the steam-chest, the said abutments extending into the cylinder and each having an inner cam-surface for the piston-heads to travel on, as set forth.

3. A rotary engine, comprising a cylinder, a piston mounted to turn therein and provided with a movable piston-head, an abutment having inlet and exhaust ports, the abutment extending into the cylinder and having a cam-surface for the piston-head to travel on, and a spring-valve on the head end of the abutment and adapted to be engaged by means on said piston, to temporarily close the inlet-port, as set forth.

4. A rotary engine, comprising a cylinder, a piston mounted to turn therein, a steam-chest provided with ports, an abutment mounted to rock in said cylinder and forming a valve on said steam-chest, the said abutment being provided with an inlet-port and an exhaust-port, and a spring-valve for temporarily closing the inlet-port, as set forth.

5. A rotary engine having a reversible abutment mounted to rock and provided with sets of inlet-ports and exhaust-ports, and spring-valves for temporarily closing the inlet-ports, as set forth.

6. A rotary engine comprising a cylinder, steam-chests on said cylinder, a piston mounted in said cylinder and provided with spring-pressed movable piston-heads, abutments mounted to rock in said cylinder and forming valves on the steam-chests, and provided with sets of inlet and exhaust ports, the said abutments extending into the cylinder and having cam-surfaces for the piston-heads to travel on, and means under the control of the operator for simultaneously turning said abutments to bring the abutments into reversing positions, as set forth.

7. A rotary engine, comprising a cylinder, a piston mounted therein and provided with spring-pressed movable piston-heads, abutments mounted to rock in said cylinder and having sets of inlet and exhaust ports, said abutments extending into the cylinder and having cam-surfaces for the piston-heads to travel on, means under the control of the operator, for simultaneously turning said abutments, to bring the abutments into reversing positions, and spring-valves on the abutments, for temporarily closing the inlet-ports of the abutments, said spring-valves being controlled by lugs on the said piston, as set forth.

8. In a rotary engine, a cylinder, a piston mounted to turn therein and provided with a movable piston-head, a steam-chest on said cylinder, an abutment provided with trunnions journaled in the cylinder-heads, the outer end of said abutment having a convex face adapted to engage a seat in the inner face of the valve-chest, the said abutment being provided with sets of inlet-ports and exhaust-ports, of which the inlet-ports are adapted to register with ports of said steam-chest, and means connected with the trunnions of said abutment for turning the abutment, as set forth.

9. A rotary engine having a reversible abutment, mounted to rock and provided with two inlet-ports extending in opposite directions and opening into the cylinder at the ends of the abutment, and two exhaust-ports located near the ends of the abutment, and spring-valves on the inner face of the abutment and having members extending over the exit end of the inlet-ports the said spring-valves being provided with ports or openings normally in register with the said inlet-ports, and arranged to be moved out of register with said ports, as set forth.

10. A rotary engine, comprising a cylinder, a piston mounted therein and provided with spring-pressed movable piston-heads, oppositely-arranged steam-chests on said cylinder provided with ports and connected with a motive-agent supply, abutments mounted to rock in said cylinder and forming valves for the said steam-chests, the said abutments having sets of inlet and exhaust ports and having inner cam-surfaces for the piston-heads to travel on, means for rocking said abutments to bring them into reversing positions, and spring-valves on the inner face of said abutments and controlled by the piston, for temporarily closing the inlet-ports of the abutments, as set forth.

In testimony whereof we have signed our names to this specification in the presence of two subscribing witnesses.

HARDY HESTAND.
ARTHUR R. MATTHEWS.

Witnesses:
ALVIN ILES,
SAM BELLAH.